Nov. 14, 1933.    W. A. GRAY    1,934,705
COMBINATION MOUSE AND RAT TRAP
Filed July 29, 1932
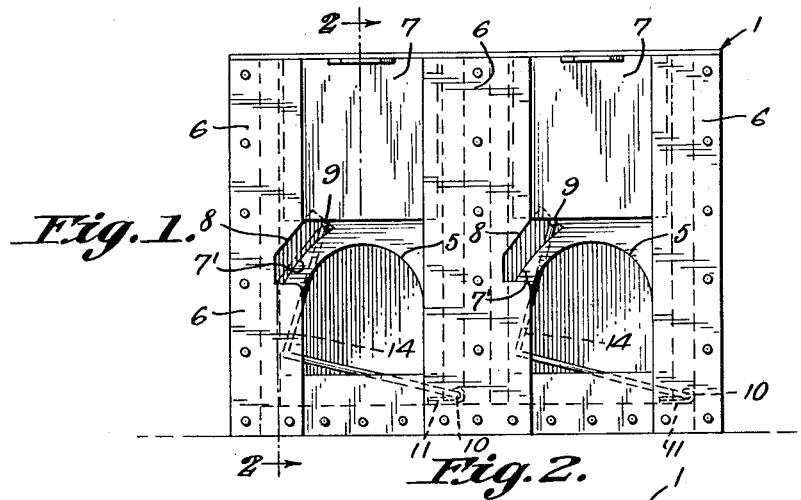
Fig. 1.
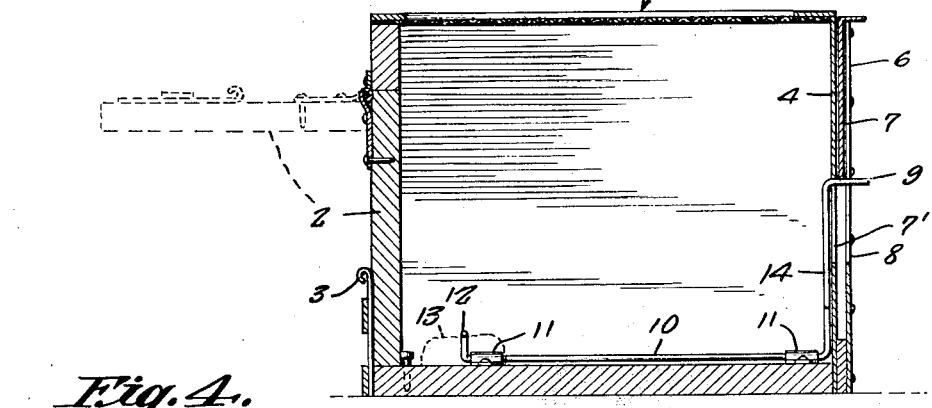
Fig. 2.
Fig. 4.
Fig. 3.
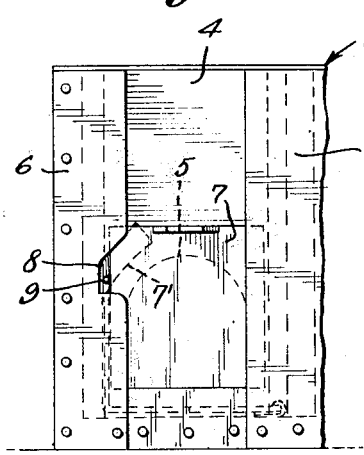
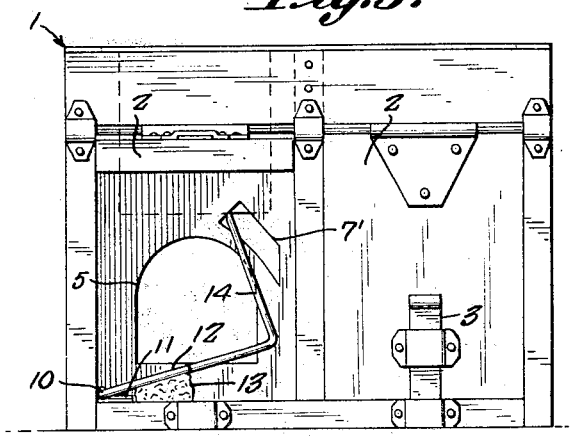
Walter A. Gray,
INVENTOR
BY Victor J. Evans & Co.
ATTORNEY Patented Nov. 14, 1933

1,934,705

UNITED STATES PATENT OFFICE 1,934,705

COMBINATION MOUSE AND RAT TRAP

Walter A. Gray, Gila, N. Mex.

Application July 29, 1932. Serial No. 626,061

1 Claim. (Cl. 43—61)

My present invention has reference to animal traps and particularly to that class of traps which catch and hold an animal without injury to the said animal and the object of the invention is the provision of an animal trap of this type which is characterized by simplicity in construction and reliability and efficiency in practical use.

To the attainment of the foregoing the invention consists in the improvement hereinafter described and definitely claimed.

In the drawing which accompanies and forms part of this specification,

Figure 1 is a front elevation of the trap.

Figure 2 is a sectional view approximately on the line 2—2 of Figure 1.

Figure 3 is a rear view of the trap, one of the doors being open.

Figure 4 is a detail front elevation showing the drop door gravitated to closed position.

The body or cage 1 of my improved trap may be of any desired material but preferably is provided with a reticulated top for ventilation as disclosed by the drawing. In the showing of the drawing I have shown a plurality of cages arranged side by side and connected to each other, but as all of the cages are of a similar construction a detail description of one will suffice.

Each cage 1 has a rear opening that is normally closed by an upwardly swinging door 2 which, of course, is hingedly connected to the rear of the cage and the door 2 is normally held in closed position by a latch 3 that is movable into a suitable keeper opening in the base or bottom of the cage. The front of the cage, indicated by the numeral 4, at a point in close proximity to the bottom of the said cage, is provided with an entrance opening 5 and the said front, at the sides of the opening, has secured thereon or formed therewith vertically disposed strips 6 spaced by suitable means from the front 4 to afford guides for a vertically movable drop door 7 which normally closes the entrance opening 5.

The front plate 4 is formed with an arcuate opening 7' in a line with the notch 8 on one of the guide strips 6. The opening and notch are designed to receive therethrough a finger 9 on the vertical arm of the right angularly bent end of a shaft 10. The shaft is arranged on the bottom along one side of the cage and is journaled through suitable bearings 11. The rear end of the shaft 10 is disposed in close proximity to the rear door 2 and the said end of the shaft is bent angularly to provide the same with an arm 12, and this arm is designed to rest upon a bait 13 when the trap is in set position, that is, when the drop door 7 is elevated to uncover the entrance opening 5. The bait is arranged in the top through the opening closed by the door 2 and when the arm 12 is swung over the bait the finger 9 on the right angle end 14 of the shank will be swung through the notch 8 and the opening 7' directly under the lower edge of the raised drop door 7, thus holding the door in open position.

A rodent or like animal entering the cage seizes the bait and withdraws the same from beneath the arm 12. The weighted drop door will then exert a pressure upon the finger 9, causing the same to travel through the opening 7' into the notch 8 and from under the door 7, so that the said door 7 will gravitate to closed position to cover the entrance opening 5. The entrapped animal is not in anyways injured when captured and the said animal may be removed from the trap by tilting the same over fire or a body of water and unlatching the door 2 so as to precipitate the captured animal into the fire, water or other destructive agent.

While I have illustrated a satisfactory embodiment of my improved device my features of invention are capable of extended application and I do not wish to be limited to the specific structure herein shown and described.

Having described the invention, I claim:—

An animal trap comprising a cage having an entrance opening in the front thereof, said front, above and at one side of the opening being provided with an arcuate slot, vertical guides arranged on the cage at opposite sides of the opening and one of said guides having a notch communicating with the slot, a vertically movable drop door slidable in the guides for normally closing the entrance opening and movable above said opening, a shaft journaled to the bottom of the cage and having an angle end provided with an offset finger that is movable through the opening to underlie the drop door when in raised position, and the second end of the shaft having an angle arm designed to rest on the bait for holding the fingered end of the shaft under the door.

WALTER A. GRAY.